No. 763,024.                                                                Patented June 21, 1904.

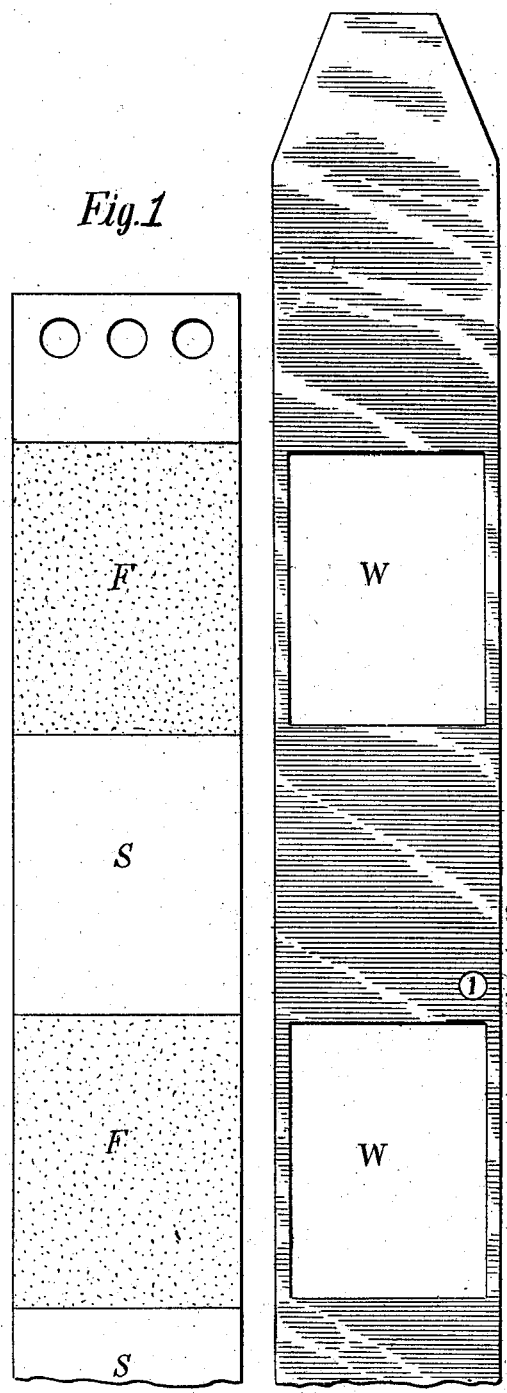

UNITED STATES PATENT OFFICE.

FREDERICK SCHMID, OF NEW YORK, N. Y.

PHOTOGRAPHIC ROLL-FILM.

SPECIFICATION forming part of Letters Patent No. 763,024, dated June 21, 1904.

Application filed March 21, 1901. Serial No. 52,135. (No model.)

*To all whom it may concern:*

Be it known that I, FREDERICK SCHMID, a subject of the Emperor of Germany, and a resident of the city of Greater New York, in the borough of Manhattan, in the county and State of New York, have invented certain new and useful Improvements in Photographic Roll-Films, of which the following is a specification.

My invention relates to films for that class of photographic cameras wherein roll-film is employed upon which the exposures are to be made, and has particular reference to the facilities for focusing the image between the successive exposures, whereby a visual image for each length of film successively exposed may be observed prior to introducing the same into the focal plane.

In all of the so-called "roll-holding" photographic cameras in vogue at the present time in which the spool of film is contained in a receptacle on either side of the focal plane and in which continuous film is employed the image can not be focused on a focusing-screen without having to either roll the film up or remove it from the camera. By my invention I am enabled to focus each of the images prior to the exposure for the sensitive photographic surface, respectively, without having to remove the film from the camera or disturb its connection with the reel which reels it off from the supply-spool.

The different features of my invention illustrated in the drawings hereto attached are clearly described in the specification and finally pointed out in the claims.

Figure 1 is a detail plan view of a strip of photographic material embodying my invention. Fig. 2 is a similar view illustrating a light-tight wrapping for the same.

The strip of photographic material, Fig. 1, is composed of sensitive material and focusing-screens of sufficient length to cover the focusing-screen aperture of a camera. I prefer to form the strip, Fig. 1, with the alternate sections S and F of sufficient lengths as will admit of variations in the thickness of the reels of a roll-film camera as the material is wound from one of the reels to the other and at the same time leave a sufficient length between upon which to take the desired picture, and in this connection I prefer to sensitize only that portion S of the strip which will be necessary for the exposure and employ as a base upon which the sensitized material is spread a roughened or sand-blasted strip of translucent material, such as celluloid, whereby the intervening space F, having a sufficient degree of granular effect, is adapted as a focusing-screen on which to focus the alternate exposures to be made upon the sensitive portions S.

The opaque back, Fig. 2, consists of the usual black paper wrapping common to film-cartridges, with the exception that windows or openings W are cut out along its length at intervals corresponding with the sections of the focusing-screen F of Fig. 1. The indications (1, &c., denoting the number of exposures) on the back or wrapper, Fig. 2, for the successive exposures are situated at points which embrace both the length of the sensitized portions of the strip, Fig. 1, and the unsensitized or focusing-screen lengths F.

The strip, Fig. 1, is secured to the paper back or wrapper, Fig. 2, in the usual manner, and the two together are wound upon the camera-reel, as in practice in the manufacture of light-proof film-cartridges in vogue at the present time.

In adopting translucent celluloid as a support for the photographic emulsion when the granular effect of the strip of support is not desired I prefer to sensitize the sections S, as already stated, and, in lieu of the focusing-screens F, I can secure the usual focusing-screen in the camera-back in close proximity to the focal plane, so that the roughened surface of the focusing-screen of the camera will lie as close to the film as possible, in which case the spaces F are employed merely as windows through which the image is projected from the optical system of the camera upon the focusing-screen $a'$, and in this case the sections F form merely a connection between the successive sensitive sections S of the strip, Fig. 1.

I am aware that prior to my invention it has been customary when employing roll-film in photographic cameras to focus the image on a focusing-screen for each of the successive exposures alternately, and I do not, therefore, desire to claim this feature broadly, as it has been to some considerable extent in vogue in connection with roll-holders when applied to the camera-back in lieu of plate-holders, and I am also aware that it has been applied to cameras having a receptacle for a film spool and reel; but in this latter case the film was either wound up so as to be clear of the focal plane when the focusing-screen was exposed to the light or the spool containing the sensitive film taken out; but What I do claim as being new, and desire to secure by Letters Patent, is—

1. A continuous photographic film, having a sensitized part and also having a non-sensitized translucent part, upon which latter part the object may be projected, for the purpose specified, before exposing the sensitized part.

2. A photographic film having a plurality of non-sensitized translucent parts, said film also having sensitized portions alternating between the non-sensitized parts, the non-sensitized parts of the film being adapted to have the objects projected upon them, for the purpose specified, before the exposure of the sensitized portions of the film.

3. A photographic film, consisting of a rollable, translucent strip with alternating sensitized and unsensitized sections; substantially as described.

4. A photographic film, consisting of a rollable, translucent strip with alternating sensitized and unsensitized sections, of equal lengths; substantially as described.

5. A photographic film, consisting of a rollable strip of roughened translucent material having sensitized and unsensitized sections; substantially as described.

6. A photographic film consisting of a rollable strip with alternating sensitized and unsensitized sections, and an opaque back upon said strip, with openings adapted to register with its said unsensitized sections; substantially as described.

In testimony whereof I have signed my name to this specification in the presence of two subscribing witnesses.

FREDERICK SCHMID.

Witnesses:
   OTTO GOERZ,
   HENRY R. GEISLER.